US008712926B2

(12) United States Patent
Behal et al.

(10) Patent No.: US 8,712,926 B2
(45) Date of Patent: Apr. 29, 2014

(54) USING RULE INDUCTION TO IDENTIFY EMERGING TRENDS IN UNSTRUCTURED TEXT STREAMS

(75) Inventors: Amit Behal, San Jose, CA (US); Ying Chen, San Jose, CA (US); William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 12/126,829

(22) Filed: May 23, 2008

(65) Prior Publication Data

US 2009/0292660 A1 Nov. 26, 2009

(51) Int. Cl.
*G06F 15/18* (2006.01)

(52) U.S. Cl.
USPC .......................................... 706/12

(58) Field of Classification Search
USPC .......................................... 706/12
See application file for complete search history.

(56) References Cited

U.S. PATENT DOCUMENTS

| 6,253,169 | B1* | 6/2001 | Apte et al. ........................ 704/9 |
| 6,393,427 | B1* | 5/2002 | Vu et al. ........................ 707/797 |
| 7,162,413 | B1 | 1/2007 | Johnson et al. |
| 7,475,363 | B1* | 1/2009 | Yehuda et al. ................ 715/853 |
| 2002/0016800 | A1 | 2/2002 | Spivak et al. |
| 2002/0143797 | A1* | 10/2002 | Zhang et al. ................... 707/200 |
| 2004/0202368 | A1* | 10/2004 | Lee et al. ........................ 382/173 |
| 2005/0108200 | A1 | 5/2005 | Meik et al. |
| 2007/0011183 | A1* | 1/2007 | Langseth et al. ............... 707/101 |
| 2007/0043608 | A1* | 2/2007 | May et al. ........................ 705/10 |
| 2008/0005651 | A1 | 1/2008 | Grefenstette et al. |
| 2008/0104054 | A1* | 5/2008 | Spangler .......................... 707/5 |

OTHER PUBLICATIONS

Blockeel, Hendrik. David Page, and Ashwin Srinivasan. "Multi-Instance Tree Learning" 2005 [Online] Downloaded Jul. 15, 2013 http://dl.acm.org/citation.cfm?id=1102359.*
Hulten, Geoff, Laurie Spencer and Pedro Domingos "Mining Time-Changing Data Streams" Proceedings of the seventh ACM SIGKDD internatinoal conference on Kowledge discovery and Data mining 2001 [Online] Downloaded Sep. 11, 2013 http://dl.acm.org/citation.cfm?id=502529.*

* cited by examiner

*Primary Examiner* — Ben Rifkin
(74) *Attorney, Agent, or Firm* — Shimokaji & Assoc., P.C.

(57) ABSTRACT

A method for identifying emerging concepts in unstructured text streams comprises: selecting a subset V of documents from a set U of documents; generating at least one Boolean combination of terms that partitions the set U into a plurality of categories that represent a generalized, statistically based model of the selected subset V wherein the categories are disjoint inasmuch as each document of U is included in only one category of the partition; and generating a descriptive label for each of the disjoint categories from the Boolean combination of terms for that category.

9 Claims, 3 Drawing Sheets

USING RULE INDUCTION TO IDENTIFY EMERGING TRENDS IN UNSTRUCTURED TEXT STREAMS

BACKGROUND OF THE INVENTION

The present invention relates generally to the field of information mining and, more specifically, to identifying emerging concepts in unstructured text streams.

Identification of emerging trends in unstructured text streams is an important area of interest because of the vast amount of data created daily on the world wide web, in particular in web logs (blogs). Automatically identifying emerging concepts is the fastest way to identify these trends. Mining such data to detect emerging trends that are relevant to an individual or organization is a rapidly growing industry.

Prior art approaches to detect emerging trends in text articles such as blogs have focused on detecting increased frequency of words or phrases (features) within recent blogs when compared to older blogs. These word or phrase features are typically presented to the user as new "events". One weakness of this approach is that it may result in a very large collection of such words or phrases, with underlying events and even articles repeated across features. Also, the events are labeled with just a word or phrase feature, providing little contextual information about the event—like a new event within a larger, continuing event.

SUMMARY OF THE INVENTION

In one embodiment of the present invention, a method includes: selecting a subset V of documents from a set U of documents; generating at least one Boolean combination of terms that partitions the set U into a plurality of categories that represent a generalized, statistically based model of the selected subset V wherein the categories are disjoint insofar as each document of U is included in only one category of the partition; and generating a descriptive label for each of the disjoint categories from the Boolean combination of terms for that category.

In another embodiment of the present invention, a system executes steps for: using a decision tree to classify documents from a set U of documents into categories based on a subset V of U; converting the decision tree into a logically equivalent rule set, wherein each document of U is guaranteed to only be classified by one rule of the rule set; labeling, for each one of the categories based on the subset V, a text event; and displaying a list of results based on the text event labels to a user.

In still another embodiment of the present invention, a computer program product comprises a computer useable medium including a computer readable program, wherein the computer readable program when executed on a computer causes the computer to: identify a dictionary of frequently used terms in a text data set U; create a feature space that identifies the dictionary term occurrences in each document of U; apply a rule induction algorithm to the feature space over U to identify rules that classify documents into categories based on a subset V of U; use feature based antecedents of each rule to describe events; and display the events using the positive antecedents.

These and other features, aspects and advantages of the present invention will become better understood with reference to the following drawings, description and claims.

DETAILED DESCRIPTION OF THE INVENTION

Figure 1:
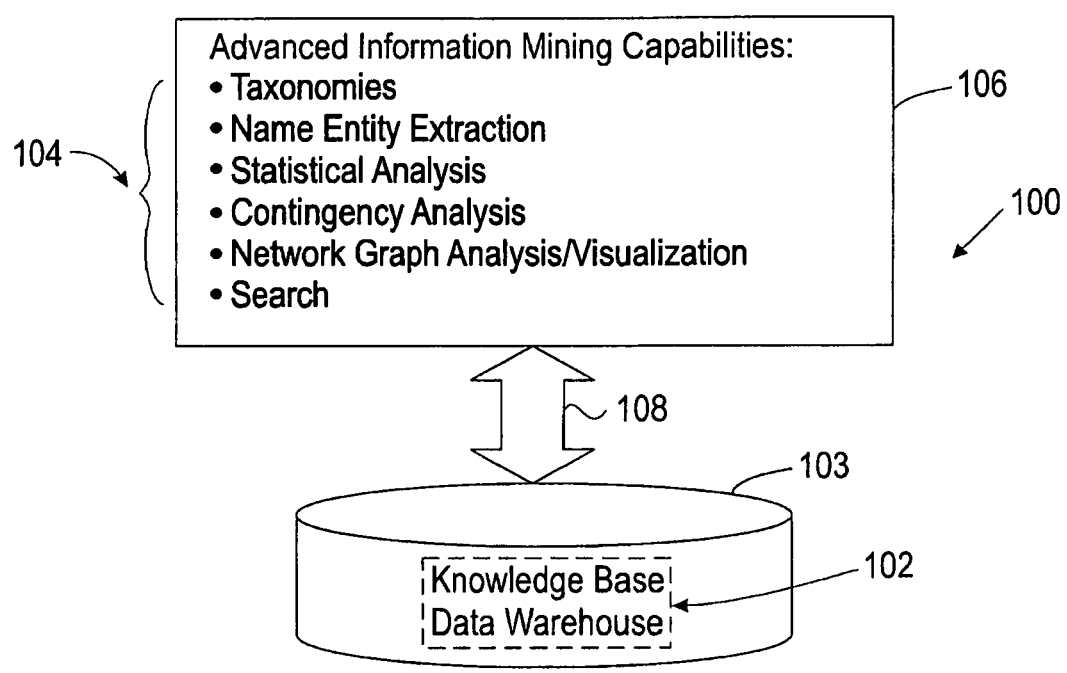
FIG. 1 is a system block diagram illustrating a system for information mining in accordance with an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a system and method for automatically uncovering emerging concepts—and thereby uncovering emerging trends—in unstructured data streams—such as text. One embodiment, for example, may identify an exact set of emerging concepts by using rule based induction on top of word/phrase feature vectors derived from the text. Each of the concepts can then be named by the positive antecedents of an induced rule. The resulting list of issues generated from such rules can be used to create a minimal set of concepts that closely mirrors the issues found in the text, without undue concept duplication. Embodiments of the present invention may be used by businesses to extend the leverage gained through applying technologies such as relational database management systems and techniques such as data warehousing to enterprise data by enabling the application of those technologies and techniques to electronic text, for which it is expected that the amount of knowledge encoded in electronic text far surpasses that available in data alone.

One way to identify interesting features imbedded in unstructured text is by identifying significant differences between the text features of a set of documents and a particular subset. One embodiment of the present invention may isolate a time period to define a subset and, thus, the invention may define emerging concepts as individual words or combinations of words that occur with significantly higher frequency during a selected time period than they do overall. Embodiments of the present invention may use this time period definition of emerging concepts, for example, to find emerging text features. By way of contrast, prior art attempts to identify emerging text features have focused on statistical or graphical techniques that looked for individual spikes over time or correlations with a given feature and time. Such prior art approaches convert text examples into numeric vectors of features (sometimes using latent semantic indexing and principle component analysis to reduce dimensionality) and then look for some statistical correlation between each feature and a time variable. Any such correlation is then presented to the user as a potential area for further investigation, usually by presenting examples that contain the identified feature at the identified time interval. One problem with approaches of this kind is that they often produce multiple, overlapping correlated features to represent a single event. In fact a single underlying event may manifest itself in many different news stories or blogs and generate a significant number of features. This leaves it to the user to try to determine whether there is one event or multiple events underlying the set of significant features that are discovered to be correlated with a given time period. The present invention differs from such prior art approaches in solving this problem by employing rule induction techniques on top of the feature space to find a specific combination of features that describe each individual news event. The approach of the present invention may generally create the shortest possible description of all significant events in the data that manifest themselves through feature correlations within a given time period. The result achieved by the present invention is usually a far more compact and accurate description, relative to the prior art approaches, of each event as it appears in the text stream.

FIG. 1 illustrates information retrieval system 100 in accordance with one embodiment of the present invention. Information retrieval system 100 may utilize a set of analytics tools 104 to aid the use of rule induction to identify emerging concepts in unstructured text streams included in information available from a knowledge base data warehouse 102. The data warehouse 102 may be implemented using computer-readable storage devices 103. Computer-readable storage devices 103 may communicate with a computer system 106 via a network, electronic, or other communication path 108. Computer system 106 may provide an interface for a human user to access data warehouse 102 and may be used to implement and provide a human user interface for analytics tools 104. Data warehouse 102 may contain documents that include, for example, current information from the internet—such as daily-updated blogs—as well as other kinds of information that are helpful in analysis. The information could include, for example, text from blogs and message boards regarding manufactured products. The analytics tools 104 may provide functions including, for example, exploring the data warehouse 102 and applying rule induction to text documents in accordance with the invention. As indicated in FIG. 1, analytics tools 104 may include capabilities for providing an end user with, for example, taxonomies, name entity extraction, statistical analyses, contingency analyses, and network graph analysis, and visualization.

Figure 2:
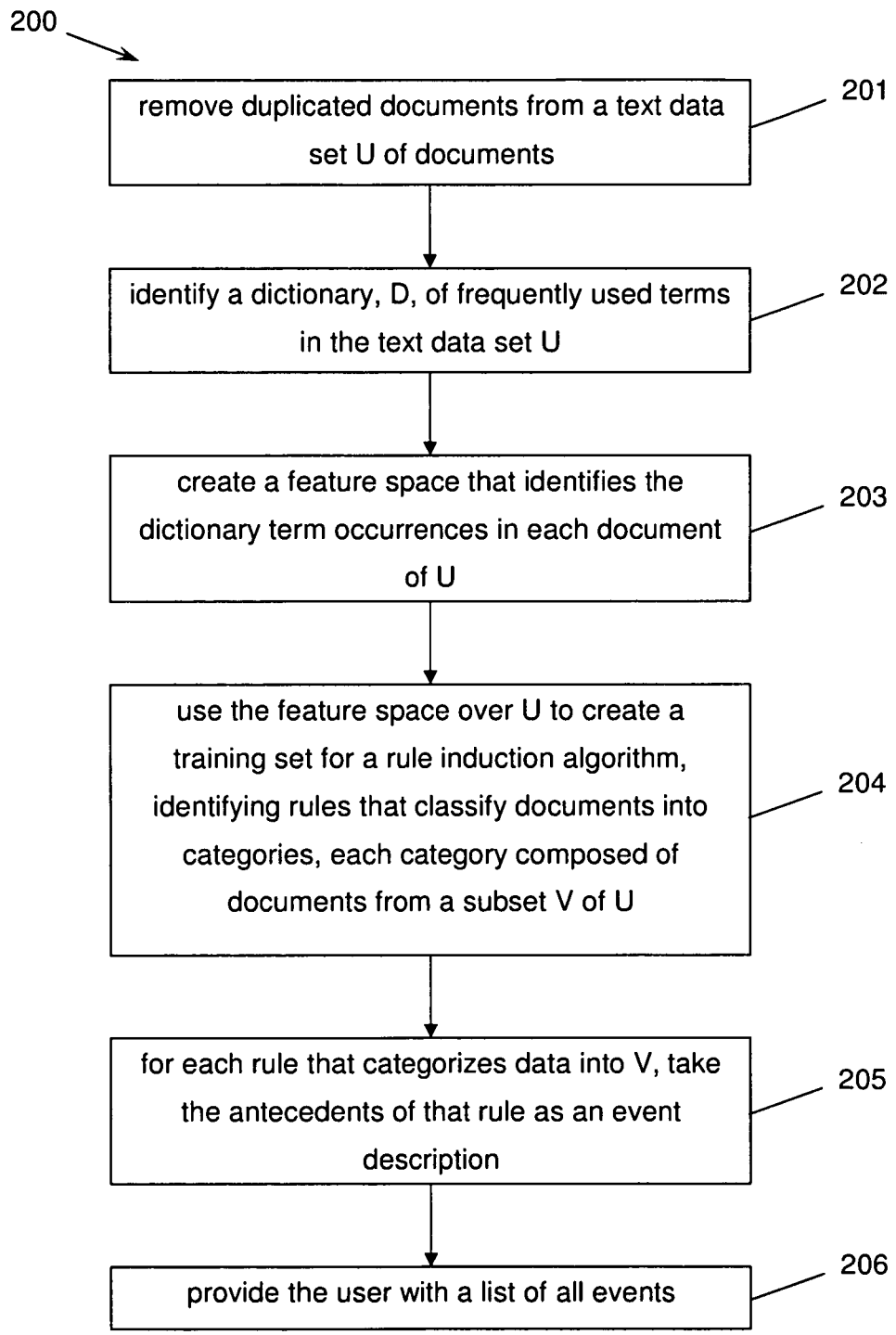
FIG. 2 is a flowchart illustrating a method of information mining in accordance with an embodiment of the present invention.

FIG. 2 illustrates a method 200, according to the present invention, that may be applied to any situation where a user wants to create a taxonomy across a set of distinct documents. Method 200 may be used, for example, to construct a cohesive term taxonomy for a document set U and a subset V of U. For example, each document of U may have a time stamp, and the subset V may consist of all documents in a given time period of interest. More generally, the subset V may be selected, for example, by filtering the documents of U using a structured field and the structured field may be based on time. Also, for example, emerging trends may be deduced by selecting documents that are more recent than a user-defined date. Even more generally, the structured field may be based on geography, for example, business unit, or assignee.

Method 200 may perform the following steps, as shown in FIG. 2 and described more fully below: step 201, remove duplicated documents from the set U; step 202, identify a dictionary, D, of frequently used words and phrases (referred to more generally as "terms") in the text data set U; step 203, create a feature space that identifies the dictionary term occurrences in each document of U; step 204, use the feature space over U to create a training set for a rule induction algorithm, the goal being to identify rules that classify documents into a category composed of documents from the subset V; step 205, for each rule that categorizes data into V, take the antecedents of that rule as an event description; and step 206, provide the user with a list of all events. Each of the steps may employ variations depending on circumstances and user preferences for the resulting taxonomy.

Still referring to FIG. 2, at step 201 method 200 may, for example, use computer system 106 to remove duplicated articles from the data stream, e.g., from the text data set U. Because method 200 may define emerging concepts by measuring increased features, it may be necessary at step 201 to remove duplicated articles from the data stream. With web or news data, pages or stories can be repeated, so method 200 may use bag of words near duplication detection to remove multiple copies of the same article. With message board data, the title may be the same for many posts, even if the topic within the posts has drifted, so method 200 may also employ title only duplicate detection. The details of step 201, thus, may depend on the domain of the text data set U.

At step 202, method 200 may identify a dictionary, D, of frequently used terms, e.g., words and phrases, in the text data set U. Method 200 may represent each document as a vector of weighted frequencies of the document features (words and phrases). A weighting scheme may be used that emphasizes words with high frequency in a document, and normalizes each document vector to have unit Euclidean norm. For example, if a document were the sentence, "We have no bananas, we have no bananas today," and the dictionary consisted of only two terms, "bananas" and "today", then the unnormalized document vector would be $\{2\ 1\}$ (to indicate two bananas and one today), and the normalized version would be: $[2/\sqrt{5} \cdot 1/\sqrt{5}]$. A weighting scheme such as the "txn" weighting scheme, known in the art, may be used, for example.

The words and phrases that make up the document feature space may be determined by first counting which words occur most frequently (in the most documents) in the text. A standard "stop word" list may be used to eliminate words such as "and", "but", and "the". The top N words may be retained in a first pass through the text data set U, where the value of N may vary depending on the length of the documents, the number of documents, and the number of categories to be created. Typically, N=2,000 is sufficient for 10,000 short documents of around 200 words to be divided into 30 categories. After selecting the words in the first pass, method 200 may make a second pass to count the frequency of the phrases that occur using the top N words. A phrase may be considered to be a sequence of two words occurring in order with out intervening non-stop words. Method 200 may prune to keep only the N most frequent words and phrases. This dictionary, D, may become the feature space.

At step 203, method 200 may create a feature space that identifies the dictionary term occurrences in each document of U. A sparse matrix of word occurrences in documents may be created after the third pass through the text data set U to index the documents by their feature occurrences. This matrix may record how often each dictionary term occurs in each document. The feature space may also contain some special annotated features, but that is not required, nor does it necessarily affect the results.

The user may edit the feature space as desired to improve rule performance. Editing may include adding in particular words and phrases the user deems to be important, such as named entities like "International Business Machines". Stemming (as known in the art) may also be incorporated to create a default synonym table that the user may also edit.

At step 204, method 200 may use the feature space over U to create a training set for a rule induction algorithm, in order to identify rules that classify documents into categories composed of V. The rule induction classifier (see, for example, Johnson, D. E., Oles, F. J., Zhang, T., and Goetz, T., 2002; "A decision-tree-based symbolic rule induction system for text categorization"; IBM Systems Journal 41:3, pp. 428-437) may be based on a fast decision tree system that takes advantage of the sparsity of text data, and a rule simplification method that converts a decision tree into a logically equivalent rule set. The classifier may also use a modified entropy function that both favors splits enhancing the purity of partitions and, in contrast to standard entropy metrics, may be close to the classification error curve, which has been found to improve text classification accuracy. Method 200 may apply a rule induction algorithm to the data, simplifying the features to be binary: either A=0 (word A does not occur) or A>0 (word A occurs). Because the rule induction algorithm uses a decision tree, method 200 may guarantee that each article (document of U) will only appear in one rule. The rules may be viewed as Boolean combinations of terms that partition the set U into disjoint, i.e., non-overlapping, categories that, taken together, represent a generalized, statistically based model of the selected subset V.

At step 205, method 200 may, for each rule that categorizes data into V, take the antecedents of that rule as an event description. For example, the fictional decision tree 300 shown in FIG. 3 may be used to illustrate the rule descriptions. The feature based antecedents 302 of each induced rule may describe a text event. So for each leaf node 304 in the decision tree 300 that classifies documents into the subset V, method 200 may take the path to the root 306 and label the event with the antecedents 302 on that path. The square numbered leaf nodes 308 may contain only articles that are only in set V, while the round black leaf nodes 310 may contain articles only in set U-V, i.e., only in U and not in V.

Decision tree 300 may make the following rules:
1) read>0 & puzzles=0
2) read=0 & automotive>0
3) read=0 & automotive none=0 & details=1 & author=1
4) read=0 & automotive none=0 & details=0

At step 206, method 200 may display results. For example, method 200 may provide a user with a list of all events. When displaying the rules to the user, method 200 may create a description by removing the negative antecedents (e.g., A=0) and keeping only features that occur more than 0 times (e.g., positive antecedents, A>0). If a category of V has no positive antecedents, method 200 may label it "Miscellaneous."

Figure 3:
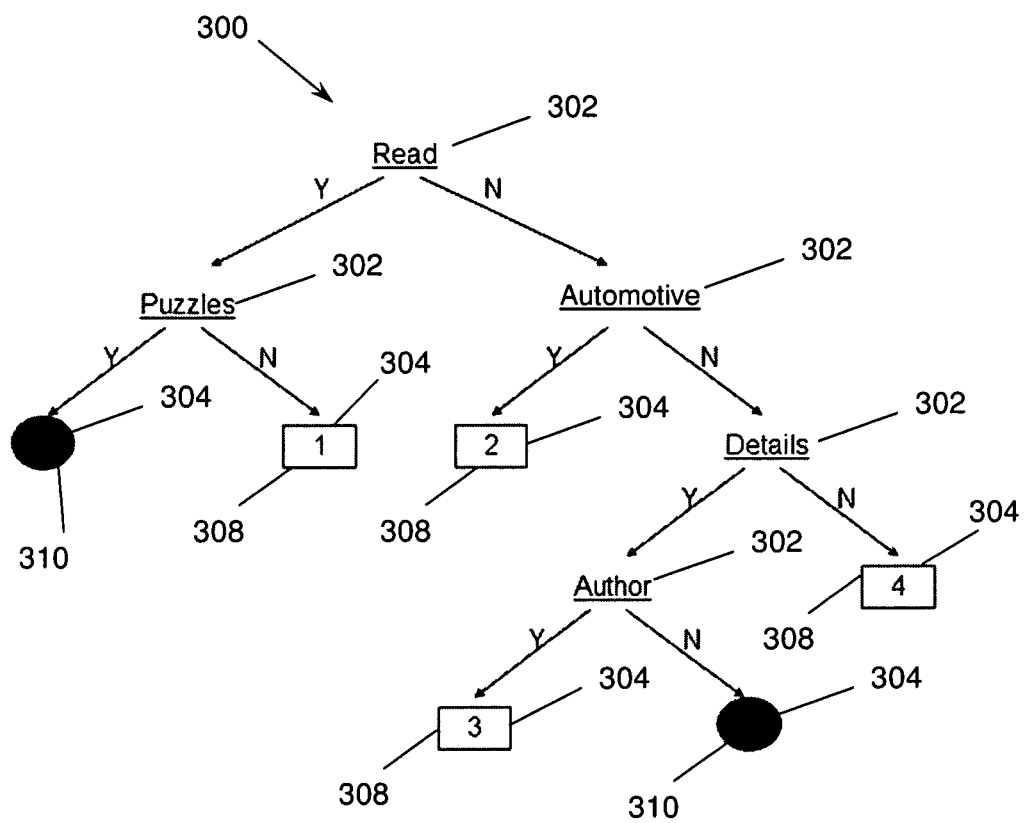
FIG. 3 is a decision tree illustrating one example of rule descriptions for text events in accordance with an embodiment of the present invention.

From the example illustrated in FIG. 3, this would lead to the rules:
1) read
2) automotive
3) details author
4) Miscellaneous.

These rules can be displayed as a sortable table, tag cloud, or any other representation that 1) displays the number of articles for each rule, and 2) can reveal the underlying examples that match the rule for the given time period. In addition, method 200 may include aggregating the descriptive labels to form a complete description of the interesting matter in subset V.

EXAMPLE APPLICATION

The algorithm and its application described here may be implemented in a text monitoring and alerting solution called Corporate Brand Reputation Analysis. The example implementation monitors multiple data sources for user-defined concepts, and for unanticipated, significance based alerts. The example implementation illustrates both the inventive rule induction, and prior art, keyword based significance approaches. The results are presented in the following table for comparison.

This set was taken from blogs and message boards mentioning different chocolate brands in August and September of 2007. As can be seen, the rule based approach (displayed in the leftmost two columns of the table) creates much fewer categories, and the text descriptions do a better job of summarizing the event using multiple features:

| Rule Induction | Category Size | Keyword Significance | Category Size |
|---|---|---|---|
| phil ooc | 25 | waves | 25 |
| important phil | 4 | voice | 72 |
| table_border | 8 | van | 37 |
| deep_fried oreos | 22 | toren | 29 |
| huge deep_fried | 5 | times | 130 |
| van rose | 4 | target | 22 |
| sono | 5 | table_border | 16 |
| toren | 17 | sweet_wild | 34 |
| | | stares | 34 |
| | | softly | 91 |
| | | smirk | 25 |
| | | slight | 26 |
| | | side | 147 |
| | | scored | 33 |
| | | runs | 33 |
| | | rocky | 23 |
| | | raises | 36 |
| | | quizfarm | 88 |
| | | phil | 40 |
| | | paul | 24 |
| | | main | 57 |
| | | leans | 37 |
| | | involved | 31 |
| | | heat | 34 |
| | | hard_time | 31 |
| | | fried | 110 |
| | | fair | 43 |
| | | fact | 94 |
| | | cup | 75 |
| | | continues | 26 |
| | | caught | 51 |
| | | bringing | 22 |
| | | blinks | 40 |

EXAMPLE IMPLEMENTATION

One embodiment of this invention may be implemented as a computer program, written in the Java programming language and executed with the Java virtual machine. For example, the following Java code may be used to implement an embodiment of the invention and includes explanatory annotations set off, as known in the art, with brackets "/*"; "*/"; and "//".

```
/* This java class implements a table, where each row of the table
    represents a positive antecedent of the generated rule
*/
public class RuleTable extends AbstractInfo implements TableInfo {
    public TextClustering tc = null; // contains the feature space for the
document corpus and two categories "recent" and "Other".
    RuleSet rs = null;
    HashMap featMap = null;
    int fSize = 200; // number of features to use during rule generation.
//The creation method takes in a feature space and data partition
(TextClustering) and builds a rule based classifier based on this
information (rule induction)
    public RuleTable(TextClustering t) {
        tc = t;
        TMCLRuleBased trb = new TMCLRuleBased (tc,
tc.attribNames.length, tc.ndata, tc.nclusters); //rule induction engine
        selectFeatures( );
        registerData(trb);
        System.out.println("About to build classifier");
        trb.buildClassifier( ); //perform rule induction
        rs = com.ibm.cv.text.metric.UtilM.getRuleSet(trb);
        try { // remove any rules that are not generated for the "recent"
category
```

7
-continued

```
        for (int i=rs.size( )-1; i>=0; i--) {
            Rule r = rs.getRule(i);
            if (r.getCategory( ).equals("recent")) continue;
            rs.removeRule(i);
        }
    } catch (Exception e) {e.printStackTrace( );}
}
// Select the best features to use for rule induction
    protected void selectFeatures( )
    {
        FeatureSelection fs = new FeatureSelection(tc);
        featMap = new HashMap( );
        featMap = fs.selectFeatures(fSize, featMap);
        fSize = (short) featMap.size( );
        System.out.println("fSize = " + fSize);
    }
// Register the data to use for rule induction
protected void registerData(TMCLRuleBased trb)
{
    short count = 0;
    if (tc.ndata<10000000) { // if data set is too large, then sample.
        for (int i=0; i<tc.ndata; i++)
        {
            trb.registerID(i);
            //trb.registerClass(count, (short) tc.smembership[i]);
        }
    }
    else {
        float percentage = 10000.0F/tc.ndata;
        int pos = com.ibm.cv.Util.findPosition("recent",tc.clusterNames);
        for (int i=0; i<tc.ndata; i++) {
            if (tc.smembership[i]==pos) trb.registerID(i);
            if (Math.random( )<percentage) trb.registerID(i);
        }
    }
    trb.finishRegistration( );
}
// The remaining methods are access methods for information contained
in the rule table.
    public int getRowCount( ) {
        return rs.size( );
    }
    public int getColumnCount( ) {
        return 3;
    }
    public String getColumnName(int columnIndex) {
        switch (columnIndex) {
        case 0:
            return "Category";
        case 1:
            return "Rule";
        case 2:
            return "Confidence";
        }
        return null;
    }
    public Class getColumnClass(int columnIndex) {
        return String.class;
    }
// Returns the rule antecedent (and other information) for each relevant
rule.
    public Object getValueAt(int rowIndex,
                int columnIndex) {
        Rule r = null;
        try {
            r = rs.getRule(rowIndex);
            switch (columnIndex) {
            case 0:
                return r.getCategory( );
            case 1:
                String rc ="";
                for (int i=0; i<r.getAntecedentSize( );i++) {
                    if (i!=0) rc = rc+" & ";
                    rc = rc+ r.getAntecedent(i).asString( );
                }
                return rc;
            case 2:
                return new Float(r.getConfidence( ));
            }
```

8
-continued

```
        } catch (Exception e) {
            e.printStackTrace( );
            return null;
        }
        return null;
    }
```

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

We claim:

1. A system including a computer processor configured to operate a plurality of modules, said modules comprising:
a decision module configured to use a decision tree to classify documents from a set U of documents into categories based on a subset V of U, wherein the subset V comprises documents of U that were written within a specific time period, and the subset V provides an indication of emerging trends in the set U of documents that occur at a higher frequency during the specific time period than outside the specific time period, wherein the decision module utilizes an entropy function that favors splitting the set U into categories, and
wherein the decision module creates a separate category for the documents in V and also the documents in U that are not in V;
a conversion module configured to convert the decision tree into a logically equivalent rule set, wherein each document of U is guaranteed to only be classified by one rule of the rule set, wherein the rule set is configured as a sortable table;
a labeling module configured to label, for each one of the categories based on the subset V, a text event, wherein the labeling module is configured to label the text event with each of a plurality of antecedents including positive and negative antecedents on a path from a leaf node to the root node of the decision tree, wherein each antecedent corresponds to a particular leaf node on the path; and
a display module configured to display a list of results based on the text event labels to a user.

2. The system of claim 1, wherein each leaf node classifies documents for one of the categories based on the subset V.

3. The system of claim 1, wherein the display module is configured to:
remove negative antecedents from a text event label; and
display positive antecedents of the text event label.

4. The system of claim 1, wherein the display module is configured to:
remove negative antecedents from a text event label; and
display the text event as "Miscellaneous" if the category of the text event has no positive antecedents in the text event label.

5. The system of claim 2, wherein:
a feature space is created over U;
the decision tree is applied to the feature space in classifying the documents of U; and
the plurality of antecedents are based on features of the feature space.

6. A computer program product comprising a non-transitory computer useable medium including a computer readable program, wherein the computer readable program when executed on a computer causes the computer to:
identify a dictionary of frequently used terms in a text data set U, wherein identifying the dictionary comprises representing each document of U as a vector of weighted frequencies of the document features, the document features being words and phrases contained in the document, wherein the vector is normalized to have unit Euclidean norm;
create a feature space that identifies the dictionary term occurrences in each document of U;
apply a rule induction algorithm to the feature space over U to identify rules that classify documents into categories based on a subset V of U,
wherein the rule induction algorithm utilizes an entropy function that favors splitting the set U into categories, and
wherein the rule induction algorithm creates a separate category for the documents in V and also the documents in U that are not in V;
use feature based antecedents of each rule to describe events; and
display the events using positive and negative antecedents,
wherein the subset V comprises documents of U that were written within a specific time period, and the subset V provides an indication of emerging trends in the set U of documents that occur at a higher frequency during the specific time period than outside the specific time period.

7. The computer program product of claim 6, wherein:
the computer removes duplicates from the text data set U; and
the categories define emerging concepts in the text data set U.

8. The computer program product of claim 6, wherein:
creating the feature space comprises indexing the documents of U by their feature occurrences using the vector of weighted frequencies of the document features.

9. The computer program product of claim 6, wherein:
the rule induction algorithm is based on a decision tree; and
each event is described by labeling the event with the antecedents that occur on the path in the decision tree from the leaf node of the event to the root node.

* * * * *